UNITED STATES PATENT OFFICE.

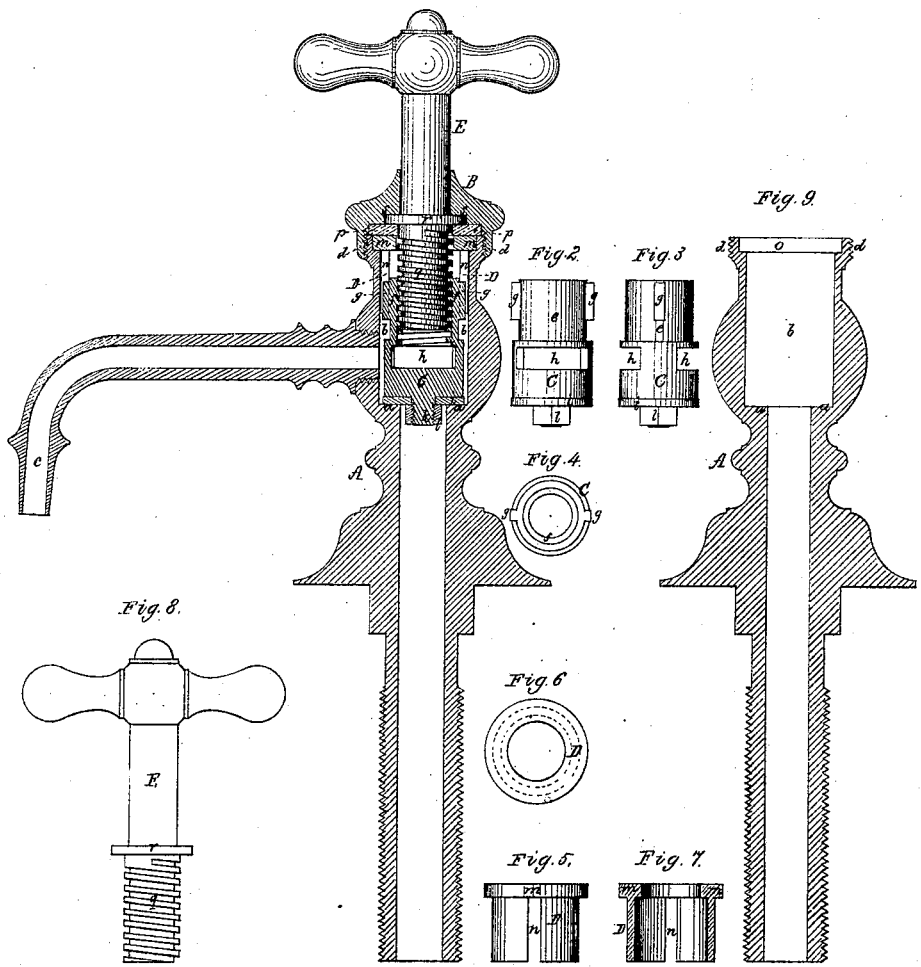

JACOB HILLS, OF HAYDENSVILLE, MASSACHUSETTS.

IMPROVEMENT IN FAUCETS.

Specification forming part of Letters Patent No. 109,902, dated December 6, 1870.

*To all persons to whom these presents may come:*

Be it known that I, JACOB HILLS, of Haydensville, of the county of Hampden and State of Massachusetts, have invented a new and useful Improvement in Basin-Faucets; and do hereby declare the same to be fully described in the following specification and represented in the accompanying drawing, in which—

Figure 1 is a vertical section of such faucet. Figs. 2 and 3 are side views of the valve. Fig. 4 is a top view of such valve. Fig. 5 is a side view, Fig. 6 a top view, and Fig. 7 a transverse section, of the valve-sleeve. Fig. 8 is a side view of the valve-key with its screw. Fig. 9 is a vertical section of the body of the faucet as it appears without its cap and the valve and key.

In such drawing, A denotes the body of the faucet, formed as represented, and provided with a flat valve-seat, $a$, and with a valve-chamber, $b$, arranged over such seat. An eduction pipe or nose, $c$, opens laterally out of the valve-chamber. At the top of the body A is a male screw, $d$, in which a cap or cover, B, is screwed.

Within the valve-chamber is the valve C, which, in its general form, is cylindrical, and is provided with a cylindrical and tubular neck, $e$, in which a female screw, $f$, is formed. The said neck has two ears or lugs, $g\ g$, projecting from opposite sides of it. Furthermore, there is a passage, $h$, made laterally through the valve. On the bottom of the valve is a leather washer, $i$, confined to the said bottom by a screw, $k$, and a nut, $l$, or other proper means.

A sleeve, D, encompasses the neck of the valve, such sleeve consisting of a short tube, having two slats, $n\ n$, on its opposite sides, and being provided with a shoulder, $m$, at its top, the whole as represented. This shoulder rests or fits into an annular rabbet or space, $o$, made in the top of the body A, and is held firmly therein and from revolving by a washer, $p$, and the cap B, when screwed down, the cap being screwed upon such washer $p$, arranged within it, and upon the top of the sleeve D and body A.

The key E has a male screw, $q$, formed upon it, to enter the female screw of the valve, and there is also in the shank of the key a fixed collar or annular projection, $r$, which fits into a corresponding recess or chamber, $s$, made in the cap.

On screwing the cap closely down upon the top of the body, or the washer intervening between them, such washer will be expanded, so as to close the joints at the upper part of the faucet, in order to prevent leakage therefrom. The washer not only performs this function, but serves to prevent the sleeve from being revolved within the valve-chamber while the key may be in the act of being turned.

The valve-chamber, where it surrounds the valve, has a diameter larger than that of the valve, in order to allow a fluid, while passing through the faucet or from the valve-seat, to have access to the eduction-tube. Facilitating the passage of the fluid from the valve-seat to the eduction-tube is the purpose of the passage $h$, made diametrically through the valve.

The slots in the sleeve are to receive the ears or lugs of the valve-neck, and when the parts are together, as shown in Fig. 1, we may raise the valve relatively to its seat by revolving the key in one direction, and depress the valve upon its seat by turning the key in the opposite direction.

The sleeve will prevent the valve from turning around, and still admit of it being moved vertically while the valve-screws are in operation.

I claim—

In the faucet as described, the combination and arrangement of the sleeve D, as explained, and its guide-slots $n\ n$, with the valve C and its guide-lugs $g\ g$, key E, the screws $f\ q$, the body A, and the cap B thereof, all being as set forth.

JACOB HILLS.

Witnesses:
T. M. CARTER,
CHRISTIAN KAPLINGER.